US010944487B2

(12) United States Patent
Leigh et al.

(10) Patent No.: US 10,944,487 B2
(45) Date of Patent: Mar. 9, 2021

(54) DISTRIBUTION AND CONTROL OF EXTERNAL LIGHT SOURCES FOR SILICON PHOTONICS BASED PLUGGABLE MODULES

(71) Applicant: Hewlett Packard Enterprise Development LP, Houston, TX (US)

(72) Inventors: Kevin B. Leigh, Houston, TX (US); Michael R. Krause, San Jose, CA (US); John Norton, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/428,756

(22) Filed: May 31, 2019

(65) Prior Publication Data
US 2020/0382220 A1    Dec. 3, 2020

(51) Int. Cl.
*H04B 10/80* (2013.01)
*G02B 6/36* (2006.01)
*G02B 6/26* (2006.01)
*G02B 6/43* (2006.01)

(52) U.S. Cl.
CPC ........... *H04B 10/801* (2013.01); *G02B 6/262* (2013.01); *G02B 6/3608* (2013.01); *G02B 6/43* (2013.01)

(58) Field of Classification Search
CPC .... H04B 10/801; G02B 6/3608; G02B 6/262; G02B 6/43
See application file for complete search history.

(56) References Cited

U.S. PATENT DOCUMENTS

| | | | |
|---|---|---|---|
| 6,343,171 B1* | 1/2002 | Yoshimura | G02B 6/43 385/50 |
| 8,179,676 B2* | 5/2012 | Julien | G02B 6/43 165/104.19 |
| 8,670,671 B2 | 3/2014 | Krishnamoorthy et al. | |
| 8,876,412 B2* | 11/2014 | Aoki | G02B 6/3576 385/139 |
| 9,166,705 B2 | 10/2015 | Joe et al. | |
| 9,247,624 B2 | 1/2016 | Tan et al. | |

(Continued)

OTHER PUBLICATIONS

Minkenberg, C. et al.; "Photonics for Datacenters: Integrated optics permeate datacenter networks"; Jan. 10, 2018; 8 pages.

(Continued)

*Primary Examiner* — Ryan A Lepisto
(74) *Attorney, Agent, or Firm* — Sheppard Mullin Richter & Hampton LLP

(57) ABSTRACT

Thermal control is provided for external light sources for silicon photonics based pluggable modules. In one embodiment, an apparatus comprises a first circuit board; a light source disposed upon the first circuit board; a silicon photonics modulator; a connector comprising a first portion and a second portion, wherein: the first and second portions are physically matable and separable; mating the first and second portions of the connector optically couples the first and second portions, the first portion is disposed upon the first circuit board, and is optically coupled to an output of the light source, and the second portion is optically coupled to an input of the silicon photonics modulator; and a thermal controller to control a temperature of the light source. Some embodiments disable the light source when the connector is separated.

21 Claims, 6 Drawing Sheets

(56) References Cited

U.S. PATENT DOCUMENTS

| | | | |
|---|---|---|---|
| 9,553,672 B1 | 1/2017 | Nagarajan | |
| 2005/0047795 A1* | 3/2005 | Windover | H04B 10/801 |
| | | | 398/164 |
| 2011/0280513 A1* | 11/2011 | Morris | G02B 6/43 |
| | | | 385/14 |

OTHER PUBLICATIONS

Carroll, L. et al.; "Photonic Packaging: Transforming Silicon Photonic Integrated Circuits into Photonic Devices"; Dec. 15, 2016; 23 pages.

* cited by examiner

DISTRIBUTION AND CONTROL OF EXTERNAL LIGHT SOURCES FOR SILICON PHOTONICS BASED PLUGGABLE MODULES

DESCRIPTION OF RELATED ART

The disclosed technology relates generally to optical communication devices, and more particularly some embodiments relate to configuration and control of such devices.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
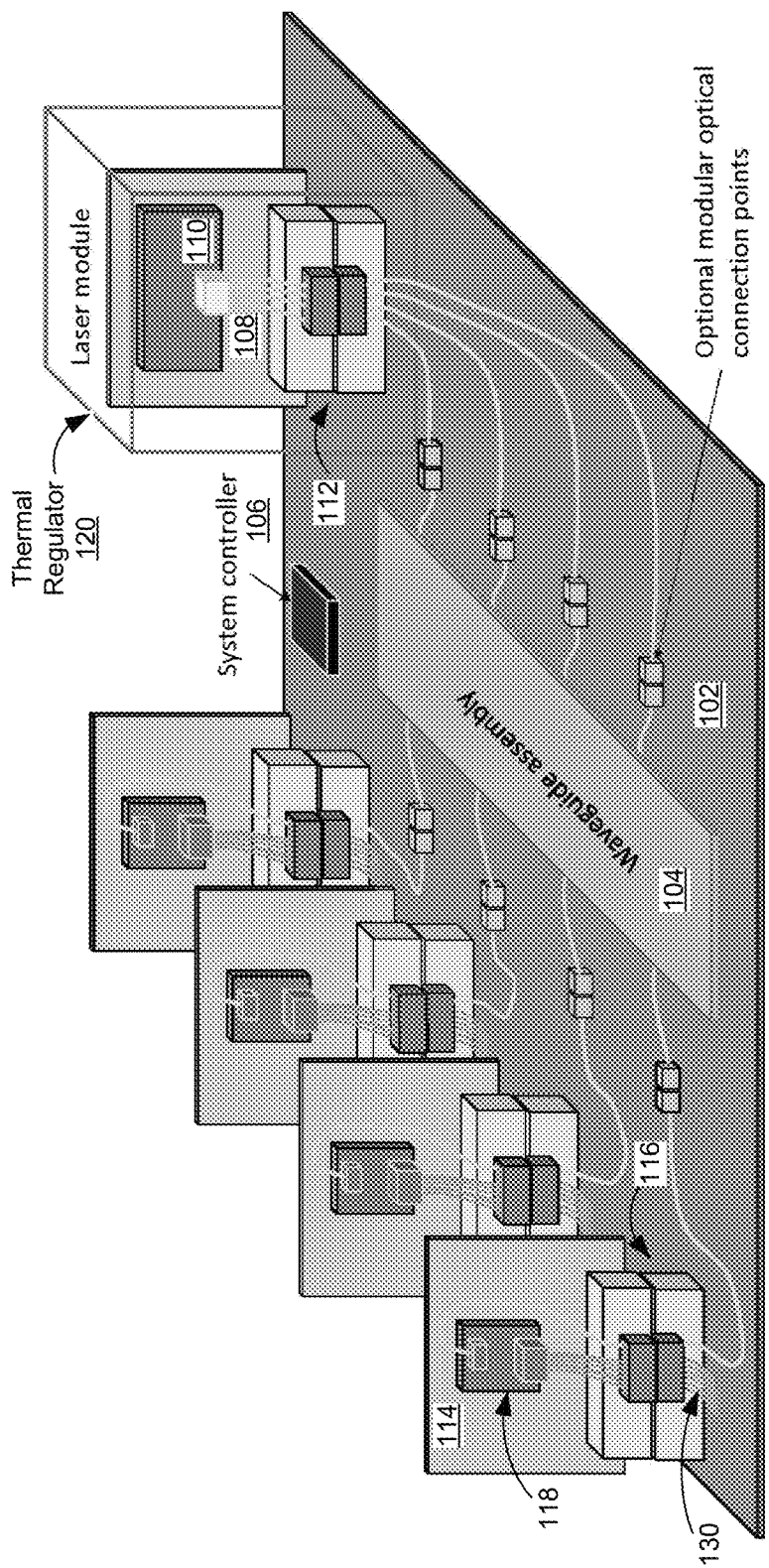
FIG. 1 illustrates a first embodiment of the disclosed technology.

The figures are not exhaustive and do not limit the present disclosure to the precise form disclosed.

DETAILED DESCRIPTION

Embodiments of the disclosed technology provide configuration, distribution, safety control and thermal control for external light sources for silicon photonics based pluggable modules. In the described embodiments, the silicon photonics based pluggable modules may include silicon photonics modulators, and the light sources may include lasers. A silicon photonics modulator may electronically modulate a carrier light provided by a laser to convey information over an optical channel, converting electrical signals to optical signals on a transmit channel. A modulator is normally accompanied by a demodulator. A demodulator converts detected light signals to electrical signals. A modulator and a demodulator together form an optical transceiver. For brevity, only the modulators related to laser will be described in the disclosed embodiments. Furthermore, the term "modulator" will be used to represent multiple electro-optic modulation elements. Each modulation element may convert an electrical signal to an optical signal for a transmit channel. Example types of a modulation element include a MZI (Mach-Zehnder Interferometer) modulator, an EA (Electro-Absorption) modulator, and a ring resonator modulator. In current implementations, the laser and modulator are physically joined in a fixed manner.

In some current implementations, the laser and modulator are fabricated as parts of a single chip. In such implementations, the temperature of the laser is affected by the temperature of other elements on the chip, for example such as high-performance compute processing logic, network switching logic, etc. As the temperature of the laser varies, the wavelength of the light produced may vary as well. This wavelength instability will adversely affect the quality of the information transmitted by the modulator. Furthermore, extreme temperature variations may affect the reliability of the laser.

In other current implementations, the laser and modulator are permanently connected by a single-mode fiber, requiring expensive active alignment to install the fixed fibers to a chip after the chip is solder reflow on a PCB. In addition, these single-mode fibers are very fragile, and are easily damaged unless they are encased within protective fiber jacket. Accordingly, these implementations are difficult to maintain and scale for many fibers.

In the disclosed embodiments, the lasers may be implemented in one or more modules, referred to herein as "laser modules" or "light source modules," that are physically separated from other components, which may be implemented in one or more modules, referred to herein as "logic modules." Each logic module may include a modulator, and may include other components such as processing logic, network switching logic, and the like. Each laser module may include one or more lasers. Because the lasers are physically separated from other components, the temperature of the laser may be controlled independently of the temperature of those components. Accordingly, the disclosed embodiments include thermal controllers for tight control of laser temperatures.

In the disclosed embodiments, each laser module is separated from the optically-coupled logic modules by one or more connectors. This arrangement may provide several advantages. Laser and logic modules may be configured such that they are easily replaced by a maintenance technician. Furthermore, some embodiments are equipped with automatic safety mechanisms to disable the laser automatically when a connector is separated. For example, when the logic module is disconnected, the laser module providing light to that logic module is automatically disabled. In some embodiments, a switch or button is provided that allows the maintenance technician to disable the laser manually. Some embodiments feature a safety indicator, for example disposed on the logic module, that indicates whether the laser is disabled or not. The safety mechanisms are intended to reduce the risk of eye and skin damages to maintenance technicians.

Embodiments may be implemented such that the separation of the laser from the logic modules provides other benefits as well. Some embodiments provide for redundant light sources, and different light source types for different functions (e.g., for internal fabrics vs. external fabrics). Some embodiments enable scalable external light sources. Dedicated laser module bays may be designed to support a large number of logic module bays requiring external light sources. A single light source may be amortized by multiple logic modules for system cost efficiencies. Embodiments may provide reliable light source availability for all the logic modules that require external light sources by using stand-by and redundant laser modules. Light sources may be placed flexibly in a system to satisfy requirements such as volumetric, serviceability, and thermal requirements, and the like. Various embodiments enable easy replacement of failed laser or logic modules. Embodiments of technology described in this disclosure are applicable to Gen-Z, PCIe and other pluggable module standards, and are also applicable to non-standard pluggable module form factors.

FIG. 1 illustrates a first embodiment of the disclosed technology. In the embodiment of FIG. 1, a plurality of silicon photonic modulators 118 receive light from a light source 110. But while only four modulators 118 are illustrated in FIG. 1, it should be understood that other quantities of modulators 118 may be implemented. In the embodiment of FIG. 1, each modulator 118 is mounted upon a respective circuit board 114. Each modulator 118 may be integrated within an integrated circuit (IC) chip or coupled to an IC chip on the circuit board 114. A circuit board 114 may be a computing device, an accelerator device, a storage device, a memory device, etc. Each circuit board 114 may be physically coupled to a motherboard 102 by a connector 116. The connector 116 may be an electro-optical connector consisting of electrical contacts and optical ferrules. The electrical contacts of the connector 116 may be used for power supplies, electrical high-speed signals, and configuration management signals. The optical ferrules of the connector 116 may be used for optical high-speed signals and external light sources. For brevity, only the optical connectivity of the connector 116 will be described for the disclosed embodiments.

Each modulator 118 may modulate light received from the light source 110 according to an information signal (not shown), and may output the modulated light on a respective fabric 130. The fabric 130 may be implemented in any manner. For example, the fabric 130 may constitute a plurality of optical fibers. Each modulator 118 may provide the modulated light to the fabric 130 through a respective connector 116.

The light source 110 may be mounted upon a circuit board 108. The circuit board 108 may be electro-optically connected to the motherboard 102 by a connector 112. The connector 112 may be an electro-optical connector consisting of electrical contacts and optical ferrules. The electrical contacts of the connector 112 may be used for power supplies, and configuration management signals. The optical ferrules of the connector 112 may be used for optical light sources. For brevity, only the optical connectivity of the connector 112 will be described for the disclosed embodiments. The light source 110 may include a laser. The circuit board 108, together with the light source 110 and any other components mounted thereon, constitute a pluggable module, which may be referred to herein as a "laser module" or "light source module." Similarly, each circuit board 114, together with the modulator 118 and any other components mounted thereon, constitute a pluggable module, which may be referred to herein as a "logic module."

Being implemented as pluggable modules, the logic modules and light source modules disclosed herein offer scalability not possible with current implementations such as those described above. For example, dedicated module bays may be used to house large numbers of logic modules and light source modules. A single light source module may provide light to many logic modules. Systems may be expanded over time by the addition of further bays and modules.

The light source 110 may provide light to the modulators 118 through a waveguide assembly 104. The waveguide assembly 104 may be implemented in any manner. For example, the waveguide assembly 104 may be implemented as single-mode fibers printed upon one or more mylar sheets. For another example, the waveguide assembly 104 may be implemented as single-mode polymer waveguide. The waveguide assembly 104 may be disposed above, below, or within the motherboard 102.

Each connector (112, 116) may include a first portion and a second portion, with one portion disposed upon the respective circuit board 108, 114, and the other portion disposed upon the motherboard 102. When the first and second portions are brought together, or mated, they may become optically coupled. When the portions of the light source connector 112 are mated, the light source 110 and the waveguide assembly 104 may become optically coupled. And when the portions of each modulator connector 116 are mated, the respective modulator 118 and the waveguide assembly 104 may become optically coupled. In this manner, the light source 110 may provide light to the modulators 118 through the waveguide assembly 104.

In the embodiment of FIG. 1, each connector 112, 116 may include a single-mode fiber optical blind mate connector, and the connectors 112, 116 may be optically coupled to the waveguide assembly 104 by single-mode fibers. Additional modular optical connection points may be included between the connectors 112, 116 and the waveguide assembly 104. This feature may enable easy replacement of the waveguide assembly 104 in case of failure or connection configuration changes.

The system may include a system controller 106, which may be mounted upon the motherboard 102. Each circuit board 108, 114 may include a module controller (not shown). The system controller 106 may detect the presence of each circuit board 108, 114, and determine its type (that is, modulator or light source) by communicating with the module controllers. Initially, the system controller 106 may disable the light source 110. Upon detecting the presence of a modulator 118, the system controller 106 may enable the light source 110 for that modulator 118 and may notify the modulator 118 of its external light source enablement. Upon detecting light from the light source 110, each modulator 118 may report the quality of the light to the system controller 106. The system controller 106, and the module controllers for the modulators 118 and the light source 110, may communicate to customize the light provided to each modulator 118. For example, adjustments may be made to the power level, wavelength window, number of wavelengths, and the like for the light provided to each modulator 118.

The system may include a thermal control system, which may be implemented as a combination of a thermal regulator 120 and a thermal controller. The thermal controller may be implemented as part of the system controller 106, the module controller mounted upon the light source circuit board 108 (not shown), or some combination thereof. Alternatively, the thermal controller may be an independent controller.

Figure 6:
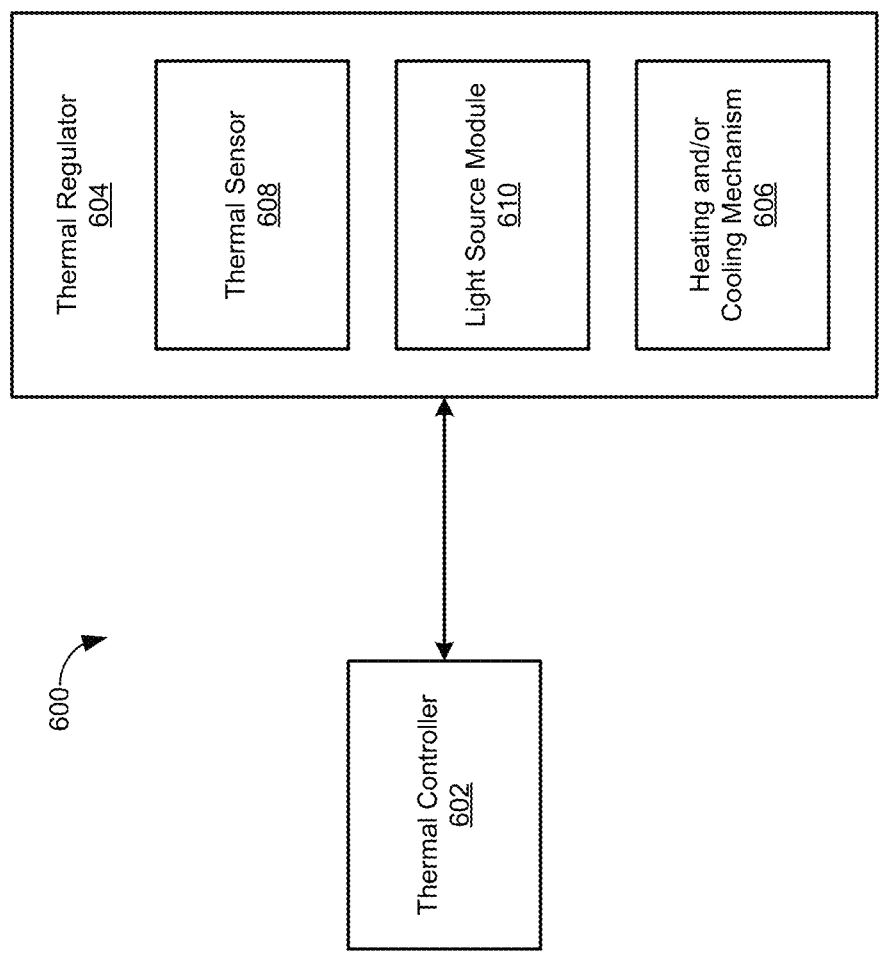
FIG. 6 illustrates a thermal control system for a light source module according to embodiments of the disclosed technology.

FIG. 6 illustrates a thermal control system 600 for a light source module 610 according to embodiments of the disclosed technology. Referring to FIG. 6, the thermal control system 600 includes a thermal controller 602 and a thermal regulator 604. The thermal controller 602 may be implemented as a processor, logic circuit, or the like. The thermal regulator 604 may be implemented as a housing, bay, or the like, that includes a heating and/or cooling mechanism 606. The mechanism 606 may include an active heater, an active cooler, a fan, a liquid circulating mechanism, and the like. The thermal regulator 604 may control the mechanism 606 to keep the temperature of the lasers in a light source module 610 within a predetermined range. The thermal regulator 604 may include a mechanism 606 for a laser or multiple lasers. The thermal regulator 604 may include a thermal sensor 608 to detect a temperature of a laser in the light source module 610, and may provide this information as feedback to the thermal controller 602. The thermal controller 602 may employ this information to maintain the temperature of the light source module 610.

Figure 2:
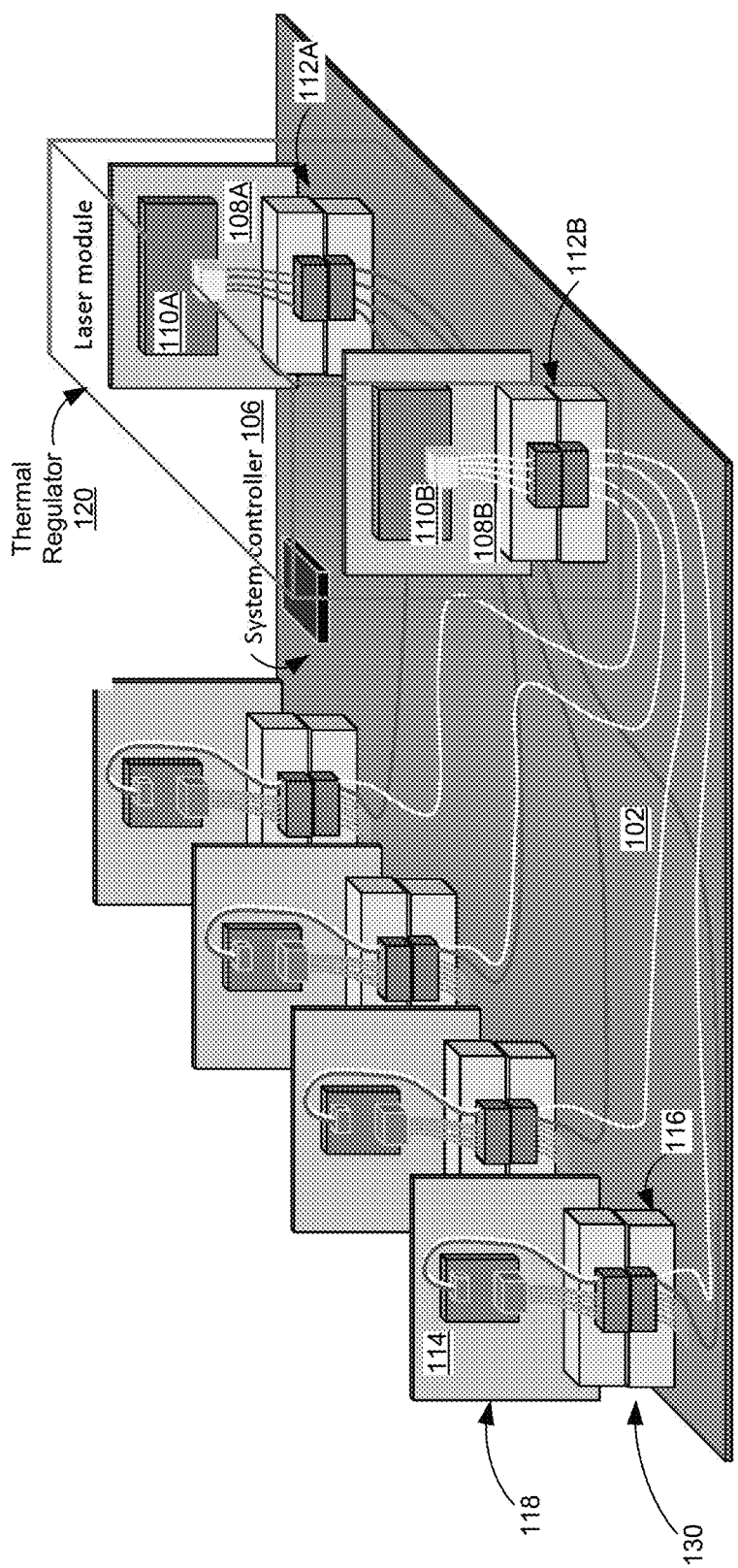
FIG. 2 illustrates a second embodiment of the disclosed technology.

FIG. 2 illustrates a second embodiment of the disclosed technology. In comparison with the embodiment of FIG. 1, which includes only a single light source 110, the embodiment of FIG. 2 may include two light sources 110A,B. But while only two light sources 110A,B are illustrated in FIG. 2, it should be understood that additional light sources 110 may be implemented. Any of the embodiments may include a thermal controller, which may be implemented as described above. In embodiments having multiple laser modules, the laser modules may share a single thermal controller, have dedicated independent thermal controllers, or any combination thereof. Similarly, in embodiments having multiple laser modules, the laser modules may share a single thermal regulator, have dedicated independent thermal regulators, or any combination thereof.

Each light source 110A,B may be mounted on a respective circuit board 108A,B. Each circuit board 108A,B may be physically connected to the motherboard 102 via a respective connector 112A,B. The light sources 110 may be optically coupled to the modulators 118 through these connectors 112A,B.

In the embodiment of FIG. 2, each modulator 118 may receive lights from both light sources 110A,B. The light sources may fulfill one or more roles. For example, one light source 110 may act as a backup or standby for the other light source 110. As another example, the light sources 110A,B may operate together to provide additional light for multiple channels within each modulator 118. As another example, the light provided by the light sources 110A,B may have different qualities, so that two different types of light are provided to multiple channels within each modulator 118. For example, two lights may have different laser power levels, used by different modulators optically coupling to different sets of fibers. For example, one light may be used to modulate for compute and memory nodes to interconnect in longer distance communication (e.g., <1 km) for large fabrics, and another light may be used for shorter distances (e.g., <<100 m) for intra-system small fabrics, e.g., among multiple accelerator modules. As another example, two lights may have different wavelength sets that may be used by the same modulator to multiply number of wavelengths for higher bandwidth coupling to a fiber The embodiment of FIG. 2 may differ from the embodiment of FIG. 1 in another way. In particular, the connectors 112, 116 of light sources 110 and the modulators 118 are coupled directly by single-mode fibers, rather than by the waveguide assembly 104 of FIG. 1. In variations of the embodiment of FIG. 2, one or more waveguides assemblies 104 may be employed. For example, a first waveguide may be employed for one light source 110A, while a second waveguide may be employed for the other light source 110B. But it should be understood that these methods of connection are illustrative only. These and other methods of connection may be employed in any of the embodiments described herein.

Figure 3:
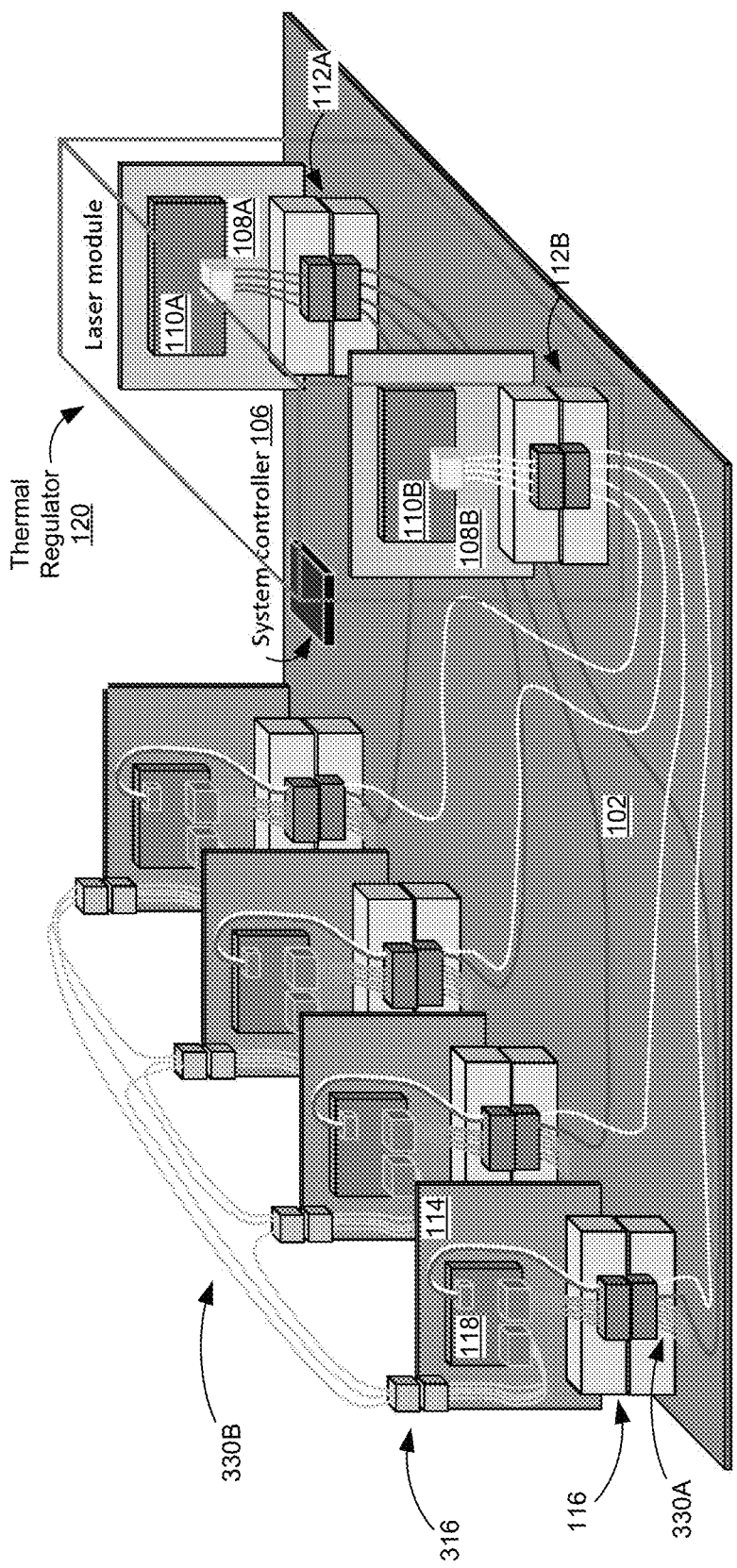
FIG. 3 illustrates a third embodiment of the disclosed technology.

FIG. 3 illustrates a third embodiment of the disclosed technology. This embodiment may include multiple light sources 110 and multiple fabrics 330A,B, with each light source 110 providing light to a respective one of the fabrics 302. Referring to FIG. 3, a first light source 110A provides light source to a first fabric 330A, while a second light source 110B may provide light to a second fabric 330B. These fabrics 330 may be implemented as optical fibers or the like. Any of the embodiments may include a thermal controller, which may be implemented as described above. In the embodiment of FIG. 3, the multiple light sources may share a single thermal controller and a thermal regulator, as in the embodiment of FIG. 2.

Figure 4:
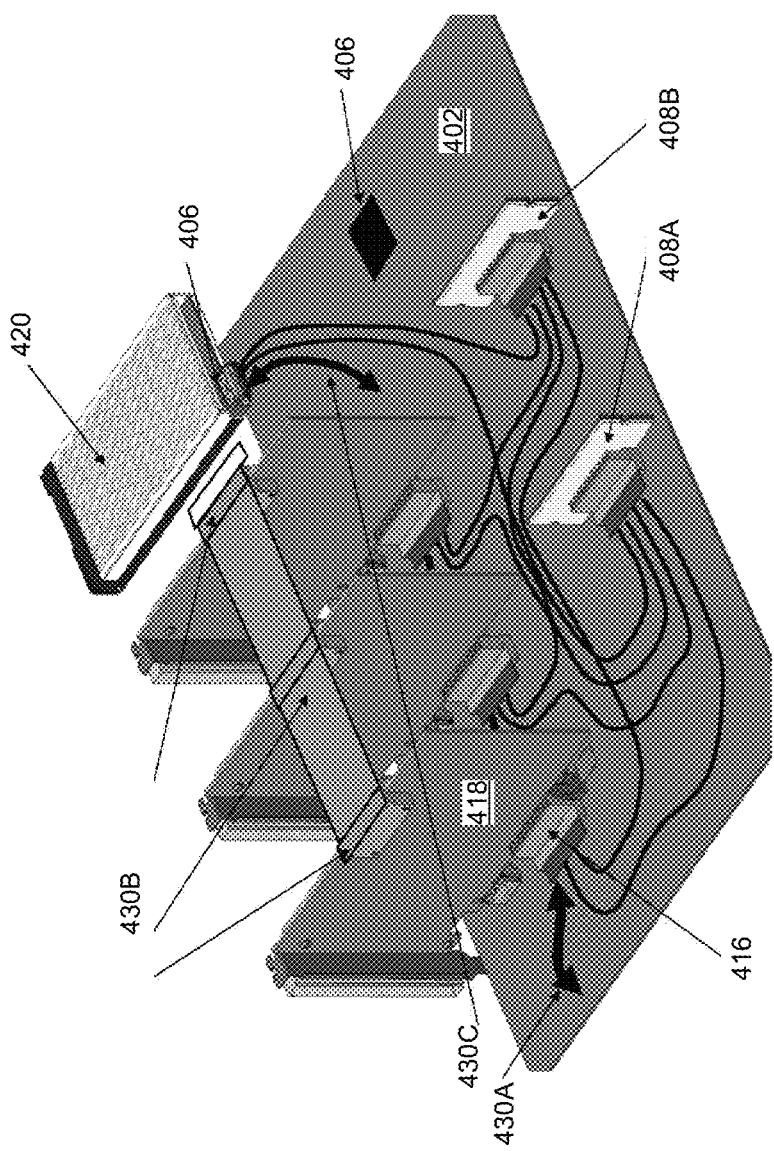
FIG. 4 illustrates a fourth embodiment of the disclosed technology.

Each modulator 118 may provide modulated light to the fabric 330A through a respective connector 116. And in the embodiment of FIG. 3, each modulator 118 may provide modulated light to the fabric 330B through a respective connector 316. The fabric 330B may interconnect the logic modules It should be noted that the disclosed technology may be used to provide light to any optical device. FIG. 4 illustrates a fourth embodiment of the disclosed technology that includes a hot-pluggable Gen-Z module 420. Referring to FIG. 4, this embodiment includes two laser modules 408A, B. Both laser modules 408A,B may provide light to three logic modules 418, and the hot-pluggable Gen-Z module 420. The laser modules 408 may provide lights to logic modules 418 to produce optical signals for a fabric 330A through a respective connector 416. As in the embodiment of FIG. 3, the logic modules 418 may be interconnected by a fabric 330B.

The Gen-Z module 420 may be a media drive with optical transceivers that receives light from both light sources 408, and is connected to a fabric Fabric-C, through a connector 406. The connector 406 may be an edge-attached modular optical connector for attachment to a standard electrical card edge blindmate connector of the Gen-Z module 420.

FIG. 4 illustrates alternative form factors for the laser modules 408 and the logic modules 418. In the embodiment of FIG. 4, each laser module 408 is implemented with a Differential Dual In-line Memory Module (DDIMM) form factor, and each logic module 418 is implemented with a PCIe (Peripheral Component Interconnect Express) card form factor. The electrical portion of the connectors 416 for the logic modules 418 are standard PCIe connectors. The optical portion of the connectors may be implemented as modularly attachable optical blindmate connectors. But these form factors are presented only by way of example. The optical infrastructure described herein may be modularly attached to an existing electrical infrastructure of pluggable modules. The electrical infrastructure may include a motherboard, electrical blindmate connectors, system controllers, system logic, and the like. The electrical infrastructure may be co-designed with mechanical infrastructure including form factors, cooling, and the like. The electro-mechanical infrastructure may comply with industry standard specifications such as PCIe, Gen-Z, etc. The modularly attachable optical infrastructure may include optical blindmate connectors that may be modularly attached to respective electrical blindmate connectors where the optical blindmate connectors are interconnected with waveguide assemblies or optical fibers.

It should be noted that other form factors can be used for both the laser modules 408 and the logic modules 418. Any of these embodiments may include one or more thermal controllers and thermal regulators for the laser modules 408. These thermal controllers and thermal regulators may be implemented as described above.

Figure 5:
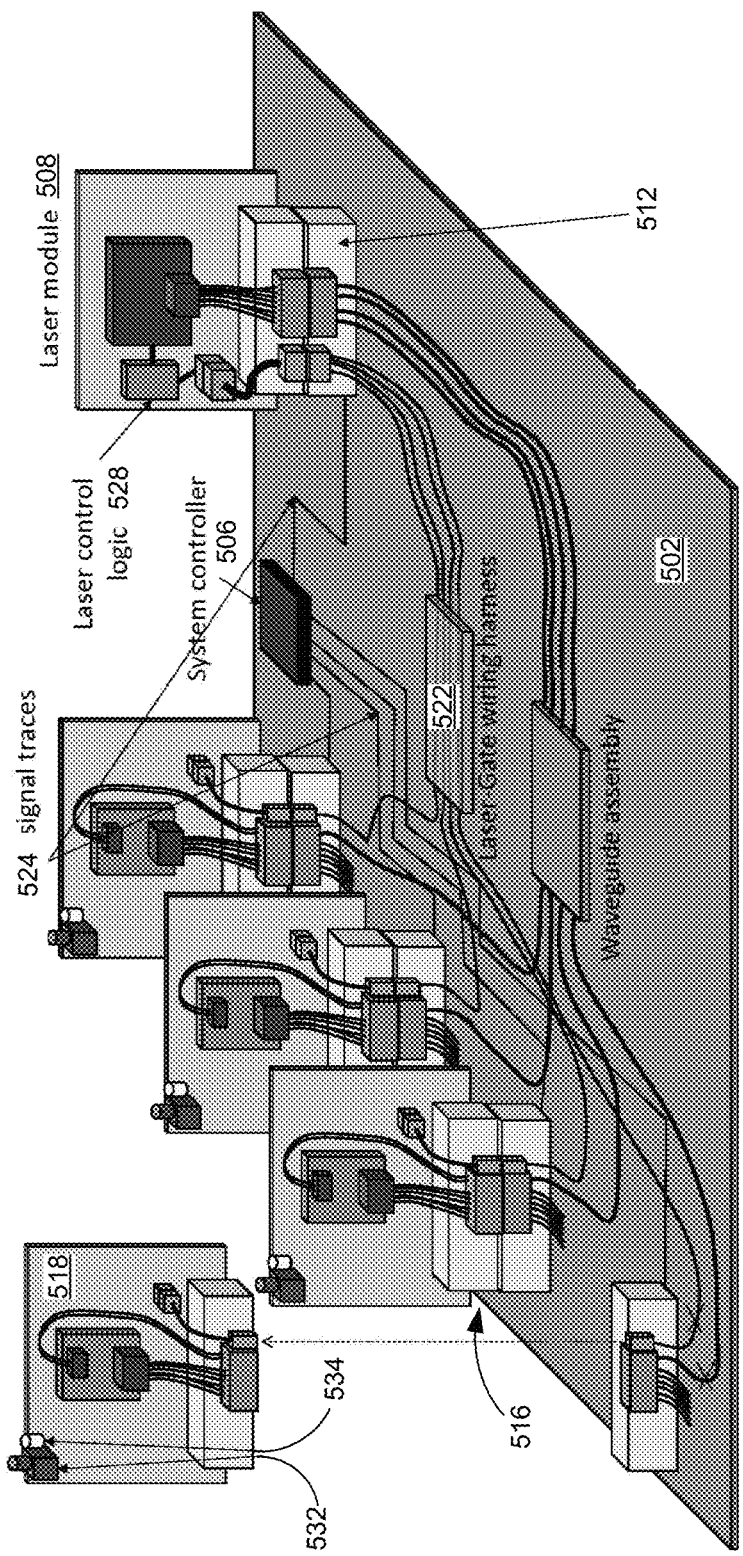
FIG. 5 illustrates several safety features of the disclosed technology.

As mentioned above, laser light presents an eye hazard to maintenance technicians. To address this problem, embodiments of the disclosed technology provide several safety features. Some of these features are illustrated in FIG. 5. In FIG. 5, an electrical connection is provided between each logic module and each laser module. One or more controllers monitors this connection. When this connection is broken, the controller disables the respective light source. For example, when a maintenance technician removes a logic module without first disabling the connected laser, the electrical connection between that logic module and its respective laser on a laser module is broken. The controller detects the breaking of the electrical connection, and disables the laser on the laser module immediately. The safety feature significantly reduces the risk of eye damage from the laser.

Referring to FIG. 5, a laser-gate wiring harness 522 is attached to a motherboard 502. Laser module 508 may have multiple lasers where each laser is connected to a number of control signals, and one of the control signals may be laser-enable signal (not shown). Therefore, a laser module 508 may have multiple laser-enable signals that are correspondingly connected to laser-gate signals of connector 512. The laser-gate wiring harness 522 provides respective laser-gate electrical signal connection between each logic module 518 and each laser module 508. Each laser-gate electrical signal connection extends through the respective logic module connector 516 and the respective laser-enable signal in a light source module connector 512. When logic module 518 is removed, the portions of the respective connector 516 are separated, thereby breaking the respective laser-gate and laser-enable electrical connection. All laser-enable connections from logic modules may be connected to a laser-gate hard-wired logic on laser module 508. When a laser-enable connection for a logic module is disconnected upon a removal of a respective logic module, the laser-gate hard-wired logic will immediately disable the light output of a respective laser on laser module 508. Each laser module 508 may include laser control logic 528. The laser control logic 528 may also detect the breaking of the laser-gate electrical signal connection, and responsive to the detection, may automatically turn off a respective laser on the laser module 508. Having both the hard-wired logic and programmatic controller logic to turn off a laser may improve laser safety.

FIG. 5 also illustrates a second system for detecting the presence of modules 508, 518. A system controller 506 may be connected to each connector by signal traces 524 on the motherboard 502. Using the signal traces 524, the system controller 506 may detect the presence of each module 508, 518, for example by attempting to communicate with a module controller of the module 508, 518. Responsive to detecting the removal of any logic module 518, the system controller 506 may disable the respective laser on laser module 508. In some embodiments, the system controller may disable respective lasers of laser modules 508 using the signal traces 524.

Some embodiments include additional safety features. Referring again to FIG. 5, each logic modules 518 may include a safety control 532 for manually disabling the respective laser on laser module(s) 508 connected to that logic module 518. For example, the safety control 532 may be implemented as a momentary push-button. Responsive to operation of the momentary push-button 532 on a logic module 518, the system controller 506 may disable any laser on any laser module connected to that logic module 518.

Each logic module 518 may include a safety indicator 534. For example, the safety indicator 534 may be implemented as an LED. When laser module 508 is providing light source to a logic modules 518, the LED may be a blinking green indicator, thereby providing a visual indicator to a maintenance technician that laser light is present and modulator is in operation, and therefore that the logic module 518 must not be removed. When no laser module 508 is providing light source to a logic modules 518, the LED may not be lit, thereby providing a visual "safe-to-remove" indicator to a maintenance technician that no laser light is present, and therefore that the logic module 518 may be removed safely. Accordingly, the maintenance technician may disable any connected lasers or laser modules 508 by actuating the momentary push-button safety control 532 and wait until the safety indicator 534 shows a safe-to-remove condition prior to removing that logic module 518 from the motherboard 502.

These features provide eye-safe operation, and skin-safe operation for high-power lasers, by automatically disabling light sources under certain conditions. All light sources may be disabled when the system power is off. A light source is disabled when a module, to which a light source provides light, is not present. The safety control described above may be used by a maintenance technician to manually disable a light source. The safety indicator confirms the light source has been disabled, and it is therefore safe to remove the module. When a module is removed in an unsafe manner, the light source providing light to that module is automatically disabled. The safety features help to prevent unplanned exposure of maintenance personnel to light sources such as lasers.

In some embodiments, the system controller may perform light source compatibility checks. In such embodiments, the system controller may query each light source module for its light source parameters, and may query each logic module for its light source requirements. The system controller may include logic to check the compatibility of these requirements and parameters. Based on these checks, the system controller may enable the light sources for compatible logic modules.

In some embodiments, the system controller may perform light source health checks. In such embodiments, the system controller may query or monitor each light source module to determine whether the module is performing within specified parameters. Responsive to a light source module not operating within parameters, the system controller may communicate the respective logic module to disable that laser of a light source module.

As used herein, a circuit might be implemented utilizing any form of hardware, software, or a combination thereof. For example, one or more processors, controllers, ASICs, PLAs, PALs, CPLDs, FPGAs, state machine, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An apparatus comprising:
   a first circuit board;
   a light source disposed upon the first circuit board;
   a silicon photonics modulator;
   a connector comprising a first portion and a second portion, wherein:
      the first and second portions are physically matable and separable relative to each other;
      mating the first and second portions of the connector optically couples the first and second portions;
      the first portion is disposed upon the first circuit board, and is optically coupled to an output of the light source; and
      the second portion is optically coupled to an input of the silicon photonics modulator; and
   a thermal controller to control a temperature of the light source.

2. The apparatus of claim 1, further comprising:
   a second circuit board;
   a second light source disposed upon the second circuit board;
   a second connector comprising a third portion and a fourth portion, wherein:
      mating the third and fourth portions optically couples the third and fourth portions;
      the third portion is disposed upon the second circuit board, and is optically coupled to an output of the second light source; and
      the fourth portion is optically coupled to an input of the silicon photonics modulator; and
   wherein the thermal controller is configured to control a temperature of the second light source.

3. The apparatus of claim 1, further wherein the first and second circuit boards are optically coupled.

4. The apparatus of claim 1, further comprising:
   a motherboard, wherein the second portion of the connector is physically attached to the motherboard;
   a second circuit board comprising the silicon photonics modulator;
   a second connector comprising a third portion and a fourth portion, wherein:
      mating the third and fourth portions optically couples the third and fourth portions, and
      the third portion is optically coupled to the second portion of the connector, and physically coupled to the motherboard, and
      the fourth portion is optically coupled to an input of the silicon photonics modulator, and disposed upon the second circuit board;
   wherein the first and second circuit boards are electrically coupled by an electrical connection through the connector and the second connector; and
   a safety circuit configured to disable the light source responsive to the electrical connection being broken.

5. The apparatus of claim 4, further comprising:
   a safety control operable to disable the light source.

6. The apparatus of claim 5, further comprising:
   wherein the first circuit board comprises the safety control.

7. The apparatus of claim 5, further comprising:
   a safety indicator to indicate whether the light source is disabled.

8. The apparatus of claim 4, further comprising:
   a control circuit electrically coupled to the connector and the second connector, the control circuit operable to disable the light source responsive to separation of at least one of the connector and the second connector.

9. The apparatus of claim 1, further comprising:
   a thermal sensor coupled to the thermal controller, the thermal sensor configured to detect the temperature of the light source and provide temperature information as feedback to the thermal controller.

10. An apparatus comprising:
    a first circuit board comprising:
       a light source, and
       a first portion of a first connector;
    a second circuit board comprising:
       a silicon photonics modulator, and
       a first portion of a second connector;
    a motherboard comprising:
       a second portion of the first connector,
       a second portion of the second connector, and
       an optical coupler optically coupling the second portion of the first connector and the second portion of the second connector; and
    a thermal controller to control a temperature of the light source independently from a temperature of the silicon photonics modulator;
    wherein the light source and the silicon photonics modulator are optically coupled responsive to (i) the first and second portions of the first connector being mated and (ii) the first and second portions of the second connector being mated;
    wherein the light source and the silicon photonics modulator are optically decoupled responsive to (iii) the first and second portions of the first connector being separated or (iv) the first and second portions of the second connector being separated;
    wherein the first circuit board and the motherboard are physically coupled responsive to the first and second portions of the first connector being mated;
    wherein the first circuit board and the motherboard are physically decoupled responsive to the first and second portions of the first connector being separated;
    wherein the second circuit board and the motherboard are physically coupled responsive to the first and second portions of the second connector being mated; and
    wherein the second circuit board and the motherboard are physically decoupled responsive to the first and second portions of the second connector being separated.

11. The apparatus of claim 10, wherein the optical coupler comprises:
    an optical waveguide.

12. The apparatus of claim 10, further comprising:
    a third circuit board comprising:
       a second light source, and
       a first portion of a third connector;
    wherein the motherboard further comprises:
       a second portion of the third connector;
    wherein the optical coupler optically couples the second portion of the third connector and the second portion of the second connector;
    wherein the thermal controller controls a temperature of the second light source independently from the temperature of the silicon photonics modulator;
    wherein the second light source and the silicon photonics modulator are optically coupled responsive to (i) the first and second portions of the first connector being mated and (ii) the first and second portions of the third connector being mated; and wherein the second light source and the silicon photonics modulator are optically decoupled responsive to (iii) the first and second portions of the first connector being separated or (iv) the first and second portions of the third connector being separated.

13. The apparatus of claim 10, further comprising:
wherein the circuit board and the light circuit are electrically coupled by an electrical connection through the first and second connectors; and
wherein the apparatus further comprises a safety circuit configured to disable the light source responsive to the electrical connection being broken.

14. The apparatus of claim 10, further comprising:
a safety control operable to disable the light source.

15. The apparatus of claim 14, further comprising:
wherein the second circuit board comprises the safety control.

16. The apparatus of claim 14, further comprising:
a safety indicator to indicate whether the light source is disabled.

17. The apparatus of claim 10, further comprising:
a control circuit electrically coupled to the first and second connectors, the control circuit operable to disable the light source responsive to separation of at least one of the first and second connectors.

18. An apparatus comprising:
a plurality of first circuit boards each comprising:
  a respective light source, and
  a first portion of a respective first connector;
a plurality of second circuit boards each comprising:
  a respective silicon photonics modulator, and
  a first portion of a respective second connector;
a motherboard comprising:
  a second portion of each first connector;
  a second portion of each second connector; and
  an optical coupler optically coupling the second portion of each first connector and the second portion of each second connector; and
a thermal controller to control a temperature of the light sources independently from temperatures of the silicon photonics modulators;

wherein each light source is optically coupled to the optical coupler responsive to the first and second portions of the respective first connector being mated;

wherein each light source is optically decoupled from the optical coupler responsive to the first and second portions of the respective first connector being separated;

wherein each silicon photonics modulator is optically coupled to the optical coupler responsive to the first and second portions of the respective second connector being mated;

wherein each light source is optically decoupled from the optical coupler responsive to the first and second portions of the respective second connector being separated;

wherein each first circuit board is physically coupled to the motherboard responsive to the first and second portions of the respective first connector being mated;

wherein each first circuit board is physically decoupled to the motherboard responsive to the first and second portions of the respective first connector being separated;

wherein each second circuit board and the motherboard are physically coupled responsive to the first and second portions of the respective second connector being mated; and wherein each second circuit board and the motherboard are physically decoupled responsive to the first and second portions of the respective second connector being separated.

19. The apparatus of claim 18, wherein:
each of the first circuit boards is electrically coupled to each of the second circuit boards by an electrical connection through the respective first and second connectors; and
the apparatus further comprises a safety circuit configured to disable each light source responsive to the respective electrical connection being broken.

20. The apparatus of claim 18, further comprising:
a safety control operable to disable the light source.

21. The apparatus of claim 18, further comprising:
a safety indicator to indicate whether the light source is disabled.

* * * * *